United States Patent
Wang et al.

(10) Patent No.: US 10,854,937 B2
(45) Date of Patent: Dec. 1, 2020

(54) PHOTORECHARGEABLE HIGH VOLTAGE REDOX BATTERY ENABLED BY PHOTOELECTRODES

(71) Applicant: The Trustees of Boston College, Chestnut Hill, MA (US)

(72) Inventors: Dunwei Wang, Newton, MA (US); Qingmei Cheng, Brighton, MA (US)

(73) Assignee: The Trustees of Boston College, Chestnut Hill, MA (US)

( * ) Notice: Subject to any disclaimer, the term of this patent is extended or adjusted under 35 U.S.C. 154(b) by 57 days.

(21) Appl. No.: 16/248,940

(22) Filed: Jan. 16, 2019

(65) Prior Publication Data
US 2019/0229387 A1    Jul. 25, 2019

Related U.S. Application Data

(60) Provisional application No. 62/619,283, filed on Jan. 19, 2018.

(51) Int. Cl.
*H01M 14/00*   (2006.01)
*H01M 8/18*    (2006.01)

(52) U.S. Cl.
CPC .......... *H01M 14/005* (2013.01); *H01M 8/18* (2013.01); *H01M 8/188* (2013.01); *H01M 2300/0014* (2013.01)

(58) Field of Classification Search
None
See application file for complete search history.

(56) References Cited

PUBLICATIONS

Cheng, Qingmei et al., "Photorechargeable High Voltage Redox Battery Enabled by $Ta_3N_5$ and GaN/Si Dual-Photoelectrode", Advanced Materials, 1700312, 2017, 8 pgs.

*Primary Examiner* — Sarah A. Slifka
(74) *Attorney, Agent, or Firm* — Kwan & Olynick LLP

(57) ABSTRACT

Solar rechargeable battery combines the advantages of photoelectrochemical devices and batteries and has emerged as an attractive alternative to artificial photosynthesis for large-scale solar energy harvesting and storage. Due to the low photovoltages by the photoelectrodes, however, most previous demonstrations of unassisted photocharge have been realized on systems with low open circuit potentials (<0.8 V). In response to this critical challenge, here the present disclosure shows that the combined photovoltages exceeding 1.4 V can be obtained using a $Ta_3N_5$ nanotube photoanode and a GaN nanowire/Si photocathode with high photocurrents (>5 mA/cm$^2$). The photoelectrode system makes it possible to operate a 1.2 V alkaline anthraquinone/ferrocyanide redox battery with a high ideal solar-to-chemical conversion efficiency of 3.0% without externally applied potentials. Importantly, the photocharged battery was successfully discharged with a high voltage output.

14 Claims, 11 Drawing Sheets

PHOTORECHARGEABLE HIGH VOLTAGE REDOX BATTERY ENABLED BY PHOTOELECTRODES

CROSS-REFERENCE TO RELATED APPLICATIONS

This application claims the benefit under 35 U.S.C. § 119(e) of U.S. Provisional Patent Application 62/619,283, entitled: "Photorechargeable High Voltage Redox Battery Enabled by Photoelectrodes", filed on 19 Jan. 2018, which is incorporated herein by reference in its entirety for all purposes.

STATEMENT OF GOVERNMENT SUPPORT

The current technology was developed in part using funds supplied by the National Science Foundation (NSF) under grant No. DMR 1055762. Accordingly, the U.S. Government has certain rights to this invention.

TECHNICAL FIELD

The present disclosure is directed to a photorechargeable high voltage redox battery, comprising photoelectrodes.

BACKGROUND

As the most abundant form of renewable energy on this planet, solar energy is diurnal and intermittent. Such a nature creates a critical challenge in its utilization. It is generally agreed upon that converting and storing the energy in chemicals by means such as electrochemical (or photoelectrochemical) reactions hold the key to large-scale, practical implementations of solar energy. Toward this direction, a variety of approaches have been proposed and actively pursued. In terms of technology readiness levels, the most direct route would be to connect photovoltaic devices with batteries (e.g., state-of-the-art Li-ion batteries). While already implemented in small-scale commercial settings, this method faces critical issues connected to the high cost of both the photovoltaic and the battery modules. Alternatively, artificial photosynthesis represents the most cost-effective route if the efficiencies of the processes can be significantly improved. Indeed, great efforts have been attracted toward the goal of efficient artificial photosynthesis. However, when the release of the stored energy by artificial photosynthesis is taken into account (through methods such as fuel cells or thermal engines), the approach features inherently low round-trip efficiencies, due to the high overpotentials associated with the breaking and formation of chemical bonds. Consider water splitting as an example to further illustrate this point. Even with the most effective catalysts, a minimum overpotential of 295 mV is required to reach a reasonable current density (e.g., at 10 $mA/cm^2$) for water splitting, corresponding to a storage potential of 1.53 V. Conversely, even with the most effective catalysts for hydrogen fuel cells (HFCs), a minimum overpotential of ~450 mV is necessary for the release of the stored energy at a reasonable current density (e.g., at 1.0 $A/cm^2$). As such, the maximum round-trip efficiency is limited to about 50%. From this perspective, it is shown that it should be beneficial to combine the advantages offered by batteries in terms of high round-trip efficiencies and the benefits held by direct (photo) electrochemical systems, in terms of high energy densities and low costs.

It is within this context that researchers have turned attention to solar rechargeable redox batteries. While the idea was originally proposed in 1976, it did not gain attractions until recently. It has been demonstrated that direct combination of dye-sensitized solar cells (DSSC) with batteries could effectively increase the round-trip efficiencies of the system. Most recently, unassisted solar rechargeable flow batteries have been achieved based on the AQDS (anthraquinone-2,7-disulphonic acid) anolyte and the iodide catholyte. Nevertheless, the discharge cell voltages of their systems are limited (<0.8 V). It has been separately demonstrated that Si photoelectrodes with buried p-n junctions can be readily utilized for the implementation of solar rechargeable redox flow batteries. While high overall solar-to-electricity efficiencies (up to 3.2%) have been obtained, the cell voltages as determined by the redox pair choices remain low. As far as cell voltages are concerned, it has been shown that connecting DSSC with a photoelectrode (CdS) in series enables a cell voltage of 1.2 V based on the $VO_2^+/VO^{2+}$ and $V^{3+}/V^{2+}$ redox couples. The poor stability of CdS in the aqueous system, nonetheless, prevented the measurement of meaningful discharge performance. Most recently, a stable hematite photoanode has been applied to directly charge an aqueous alkaline AQDS-ferrocyanide redox flow battery with cell potential of 0.74 V. Notwithstanding, the low current density (<0.5 $mA/cm^2$) of hematite and the resulting low solar-to-chemical efficiency (<0.1%) leave much to desire. To date, low cell voltage remains a critical issue for solar rechargeable redox flow batteries.

SUMMARY

The cell voltage of a solar rechargeable redox battery is limited by two factors: the achievable photovoltage of the photoelectrodes and the electrochemical potential differences between the redox pairs. Yet, it is exceedingly difficult to obtain a high photovoltage on a single light absorber. Photoelectrodes, which are likely to yield photovoltages >1.0 V, are typically wide bandgap semiconductors, which only absorb in the short wavelength region of the solar spectrum, corresponding to low overall solar-to-electricity efficiencies. However, this issue is overcome by using multiple photoelectrodes, which works well for solar rechargeable redox batteries. In some examples, the photoanode of a battery system is based on $Ta_3N_5$ nanotubes. The photocathode may be based on GaN nanowires on Si with buried p-n junctions. Together, the two photoelectrodes enable an overall photovoltage of 1.5 V. For examples, the redox systems feature hydroxy-substituted anthraquinone and ferrocyanide with an equilibrium cell voltage of 1.2 V. An overall 3.0% solar-to-chemical energy conversion efficiency was measured. Moreover, the inherent stability of the nitride systems in the presence of the redox pairs results in a stable performance up to 5 hr under photoelectrochemical operation conditions. In some examples, a discharge cell voltage is up to 1 V.

The current disclosure demonstrates features and advantages that will become apparent to one of ordinary skill in the art upon reading the attached Detailed Description.

DETAILED DESCRIPTION

Figure 1A:
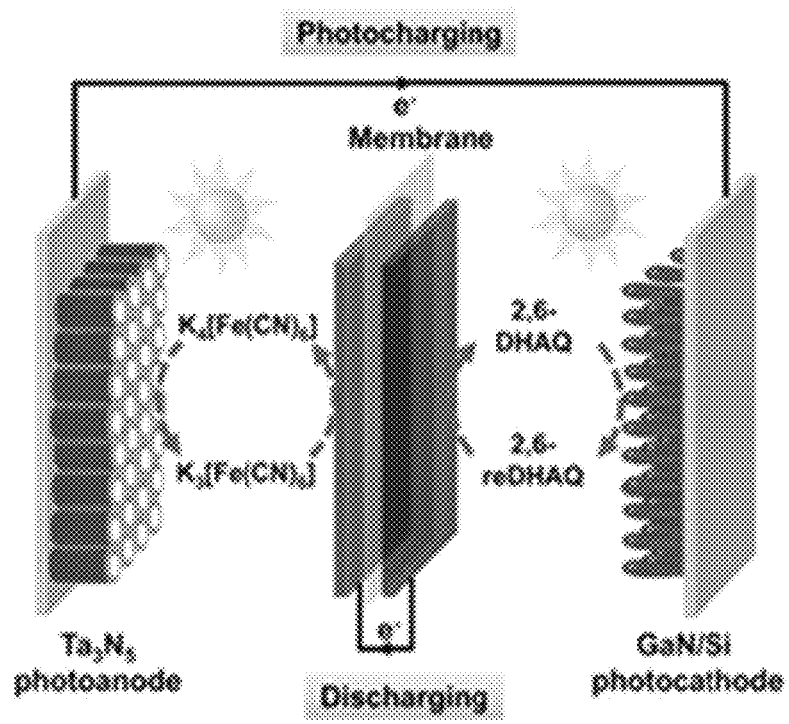
FIG. 1A is a schematic illustration of a battery including two electrolytes ($K_4[Fe(CN)_6]$ in the positive compartment and 2,6-DHAQ in the negative compartment and two photoelectrodes ($Ta_3N_5$ as the photoanode and GaN/Si as the photocathode), such that the discharge takes place on a separate set of carbon paper electrodes.

The present disclosure is directed to a photorechargeable high voltage redox battery enabled by photoelectrodes.

Without further elaboration, it is believed that one skilled in the art can, based on the above description, utilize the present disclosure to its fullest extent. The following specific embodiments and examples are, therefore, to be construed as merely illustrative, and not limitative of the remainder of the disclosure in any way whatsoever.

EXAMPLES

The following examples are provided to illustrate embodiments of the present disclosure but are by no means intended to limit its scope.

The examples described herein will be understood by one of ordinary skill in the art as exemplary protocols. One of ordinary skill in the art will be able to modify the below procedures appropriately and as necessary.

Methods and Experimental Procedures $Ta_3N_5$ Photoanode Preparation

In some examples, $Ta_3N_5$ nanotubes (NTs) are synthesized using electrochemical anodization. For example, Ta foil (e.g., 0.127 mm thick, available from Alfa Aesar in Ward Hill, Mass.) may be used as the precursor. The Ta foil may be first cut into a piece (e.g., 0.5 cm×2 cm). One side of these cut pieces may be roughened/polished with sandpaper, e.g., for 10 min. Subsequently, the polished Ta foil is cleaned by ultrasonication in acetone, methanol, iso-propanol, and deionized (DI) water, respectively, and dried by flowing air. The anodization electrolyte may be prepared by mixing sulfuric acid (e.g., 38 mL, 95-98%, available from Sigma-Aldrich in St. Louis, Mo.), hydrofluoric acid (e.g., 0.4 mL, 48%, available from Sigma-Aldrich), and deionized (DI) water (e.g., 1.6 mL). The Ta foil may be ionized with a Pt gauze, used as a counter electrode under 60 V direct current bias for 10 min without stirring. This process yields tantalum oxide NTs. The residual electrolyte on the sample surface may be removed using, e.g., ethanol and DI water. The conversion of as-prepared tantalum oxide NTs into $Ta_3N_5$ nanotubes is performed by calcining in a quartz-tube furnace (e.g., Lindberg/Blue M vacuum oven available from Thermo Fisher Scientific in Waltham, Mass.) at 1000° C. raised from the room temperature at 10° C./min rate for 2 hr under anhydrous $NH_3$ atmosphere at 300 torr with 75 sccm (standard cubic centimeter per minute) flowing rate.

$TiO_2$/GaN/Si Photocathode Preparation

In some examples, the $n^+$-p Si is prepared using the phosphorus and boron dopant precursors. These precursors may be spin coated on the front and back sides of p-doped Si (100) wafers (available from WRS Materials/Pure Wafer in San Jose, Calif., e.g., thickness: 256-306 µm; resistivity: 1-10 Ω·cm), respectively. The Si wafers are placed into a tube furnace and annealed at 900° C. for 4 hr under a $N_2$ atmosphere. The $n^+$ emitter layer and $p^+$ electron back reflection layer on the front side and back side of the Si wafer is formed during the thermal diffusion process, respectively. The $n^+$-p Si, of which the surface oxide was first removed by buffered hydrofluoric acid, is further used as substrate for growing GaN nanowire arrays by radio frequency plasma-assisted molecular beam epitaxy (MBE). The following is one examples of the growth conditions of n-type GaN nanowire arrays: a substrate temperature of 750° C., a nitrogen flow rate of 1.0 sccm, forward plasma power of 350 W, and Ga flux in the range of $4.5 \times 10^{-8}$ to $8 \times 10^{-8}$ Torr. In some examples, the nanowire arrays are doped as n-type using Ge.

In some examples, thin passivation layer of $TiO_2$ on GaN/Si is formed using atomic-layer deposition (ALD), such as Savannah 100, available from Ultratech/Cambridge Nanotech in Waltham, Mass. For examples, Ti(i-PrO)$_4$ at an operating temperature of 75° C. and $H_2O$ at an room temperature may be applied as the Ti and O sources, respectively. The deposition temperature is maintained at 275° C. with a constant flow of $N_2$ at 20 sccm. The chamber base pressure may be ~500 mTorr. The pulse and purge time for Ti(i-PrO)$_4$ and $H_2O$ is 0.1 s & 5 s, and 0.01 s & 10 s, respectively. The final thickness of $TiO_2$ passivation layer is controlled to ca. 25 nm after a growth of 750 cycles.

Photoelectrochemical Measurements

The PEC performances of various components of a battery, formed in accordance with methods described above, were characterized by a potentiostat (Modulab XM, coupled with Modulab XECS software available from AMETEK in Berwyn, Pa.) in a three-electrode system. An AM 1.5 solar simulator (Solarlight Model 16S-300-M Air Mass Solar Simulator available from Solarlight in Glenside, Pa.) was used as the light source, and the illumination intensity during the PEC measurement was adjusted to 100 mW/cm² except the investigation of the influence of the illumination intensities on the photocurrent densities. The semiconductor photoelectrodes were used as working electrodes with electrode soaked in 1 M MOH solution as the reference and Pt wire as the counter electrode. The electrode potentials have been converted to NHE scale using $E_{NHE}=E_{Hg/HgO}+0.13$ V. In a typical J-V experiment, the voltage was swept linearly ($Ta_3N_5$: from negative to positive; $TiO_2$/GaN/Si: from positive to negative) at a rate of 20 mV/s, and the whole process was stirred with constant rate (1100 rpm) except the characterization of the influence of the stirring rates on the photocurrent densities.

The overall solar-to-chemical energy conversion efficiency ($\eta_{stc}$) can be calculated according to (assuming a Faradic efficiency of 100% for both reactions), $$\eta_{stc}=[J_{op}(\text{mA/cm}^{-2}) \times 1.2(V)]/[2 \times P_{in}(\text{mW/cm}^{-2})]$$

In the above equation, $J_{op}$ stands for the maximum operating current density determined by the intersection of the individually tested J-V data of the photoelectrodes. 1.2 V is the cell equilibrium potential determined by the reversible potential of the redox couples and $P_{in}$ stands for the incident illumination power density (100 mW/cm²). For the $\eta_{stc}$ calculation, $P_{in}$ was multiplied by two in this system since the photoelectrodes were illuminated in parallel by two solar simulators in the solar rechargeable redox battery measurement.

Electrochemical Measurements

Figure 15:
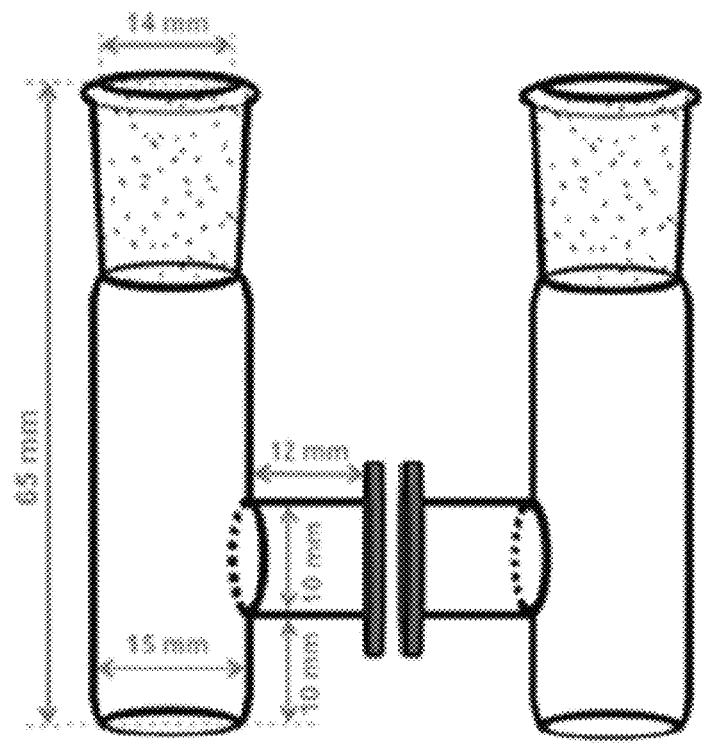
FIG. 15 shows a two-chamber cell structure, with the electrolyte volume applied in each chamber being 3 mL.

In some examples, the electrolyte, used in an electrochemical cell, comprises 0.1 M 2,6-DHAQ (90% purity, available from AK Scientific Inc. in Union City, Calif.) and 0.4 M $K_4Fe(CN)_6$ ($K_4Fe(CN)_6 \cdot 3H_2O$, 98.5-102.0%, available from Sigma Aldrich), both dissolved in KOH solution (pH 12 or 14) as required. A customized glass two-chamber cell (see FIG. 15 for detailed structure) may be used as a redox battery platform. In some examples, a sheet of pretreated Nafion 212 film (available from Fuel Cell Store in Boulder, Colo.) is used as an ion-selective membrane to separate the electrolytes into two separate chambers. The pretreatment of the Nafion 212 film may be performed by soaking the film in 80° C. deionized water for 20 min followed by soaking in 5% $H_2O_2$ for 30 min. The film may then thoroughly washed with DI water. A sheet of Sigracet® SGL 39AA porous carbon paper (1 cm², purchased from ion Power in New Castle, Del.) may be applied as both electrodes and the carbon paper was pretreated by calcining at 400° C. for 24 hr in air before use. The cell are sealed and both electrolytes may be purged with ultra-high purity $N_2$ during the whole process to avoid the oxidation of the reduction product of 2,6-DHAQ.

Electrochemical characterizations of 2,6-DHAQ/$K_4Fe(CN)_6$ battery performance were carried out on an electrochemical station (VMP3, available from BioLogic Science Instruments in France) under uninterrupted vigorous stirring (~1100 rpm).

Solar Rechargeable Redox Battery Measurements

In some aspects, solar rechargeable redox batteries are similar the above-described redox battery cells, these battery cells include $Ta_3N_5$ photoanode and $TiO_2$/GaN/Si photocathode were added into the positive compartment and negative compartment, respectively. The positive compartment maybe also referred to as catholyte chamber, while the negative compartment may be also referred to as an analyte chamber. During photocharge process, the $Ta_3N_5$ photoanode and the $TiO_2$/GaN/Si photocathode may be connected to a potentiostat (e.g., Modulab XM—referred to above) through external wires and illuminated with solar simulators (100 mW/cm², AM 1.5) in parallel. The simulated solar illumination is turned off when the photocurrent density decreased to around zero. Then, the two carbon paper electrodes are connected to the same potentiostat instead and discharged galvanostatically at 0.5 mA/cm² current density and the discharge process is terminated when the voltage decreased to 0.6 V.

Material Characterizations

The scanning electron microscope (SEM) was used to characterize the morphologis of $Ta_3N_5$ (SEM, JSM6340F) and GaN/Si (SEM, FEI Inspect F-50), UV-vis absorption spectrums were recorded by a spectrophotometer (ISS-UV/VIS available from Ocean Optics Inc. in Largo Fla.). Proton nuclear magnetic resonance CH NMR) spectra was performed using a Variant (600 MHz) NMR spectrometer. Deuterated oxide ($D_2O$, 99.9%, purchased from Cambridge Isotope Labs.) was used as the solvent. All NMR chemical shifts were reported in ppm relative to residual solvents.

Example 1

Design of the Photorechargeable High Voltage Redox Battery System

Figure 5A:
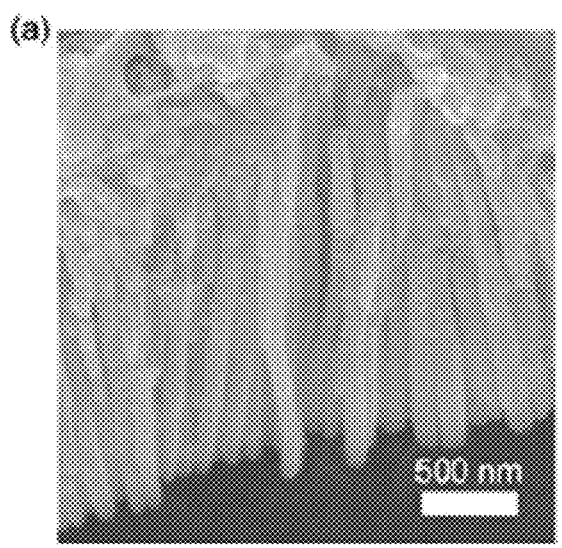
FIG. 5A shows SEM characterizations of the photoelectrodes with $Ta_3N_5$ nanotubes.
Figure 5B:
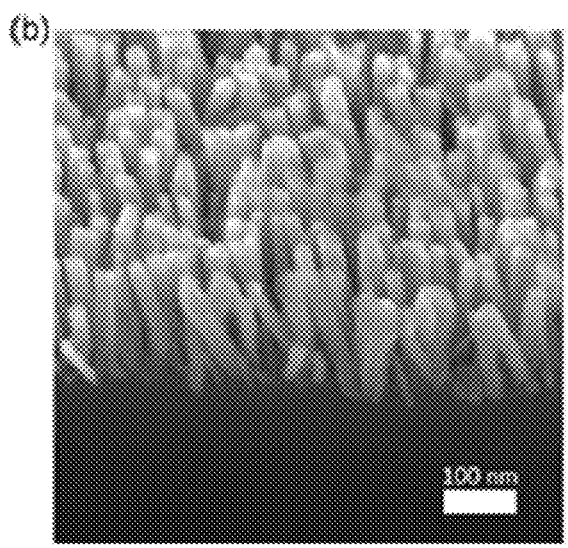
FIG. 5B shows SEM characterizations of the photoelectrodes with GaN nanowires.
Figure 6:
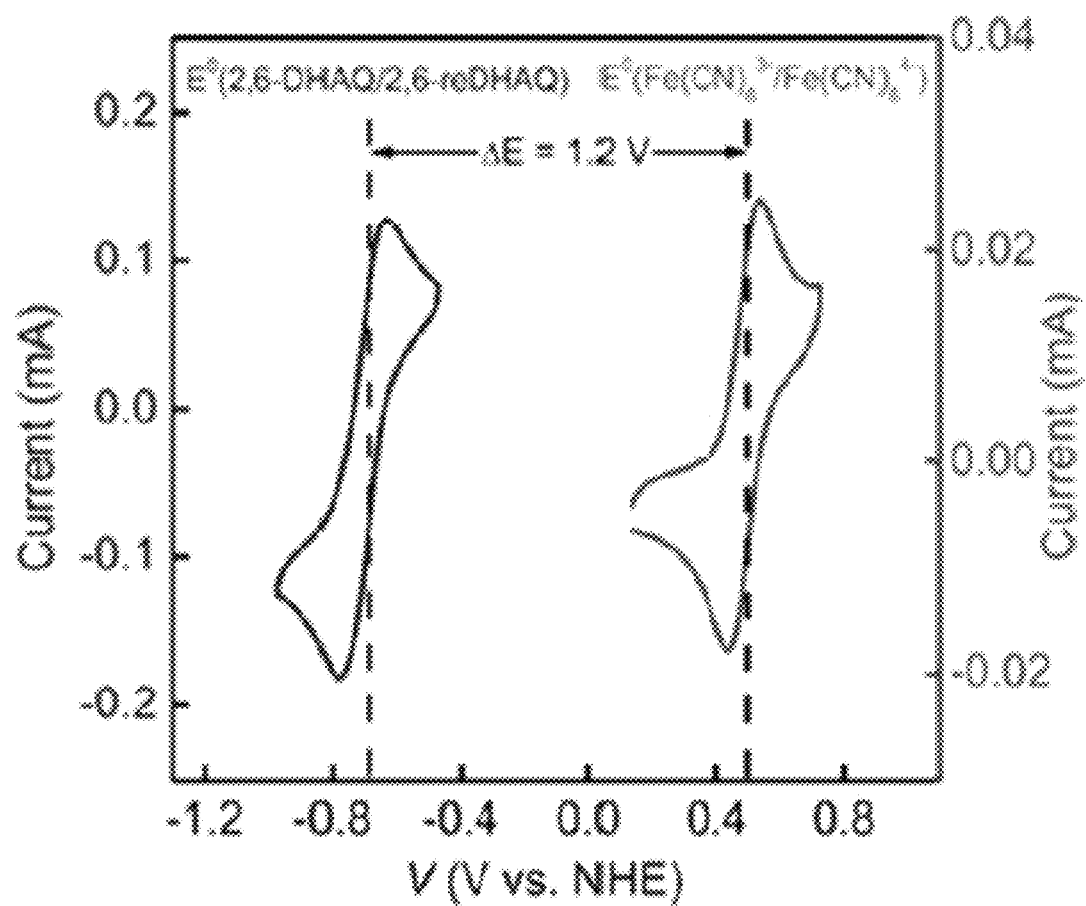
FIG. 6 shows CVs of the electrolytes on a glassy carbon electrode CV of 20 mM 2,6-DHAQ in pH 14 KOH solution (first soluction) and 2 mM $K_4[Fe(CN)_6]$ in pH 12 KOH solution (second) scanned at 100 mV/s on a glassy carbon electrode.

The design is schematically illustrated in FIG. 1a. In some examples, $Ta_3N_5$ nanotubes (see FIGS. 5A and 5B for the morphology) are used for a photoanode, which may be also referred to as a positive photoelectrode. $Ta_3N_5$ is stable in the presence of $Fe(CN)_6^{4-}$. In some examples, a photocathode, which may be also referred to as a positive photo electrode, comprises a planar $n^+$-p Si substrate and n-GaN nanowire arrays along the axial direction (GaN/$n^+$-p Si. The morphology of these structures is shown in FIGS. 5A and 5B. The light absorption and charge separation by the GaN/$n^+$-p Si system take place within the p-n junction in Si. In principle, the light absorption of the photoanode ($Ta_3N_5$) and the photocathode (Si) are complementary ($\lambda$<1100 nm for Si and $\lambda$<590 nm for $Ta_3N_5$), opening up opportunities to set up the photoelectrodes in a tandem configuration. Of the two photoelectrodes, $Ta_3N_5$ is expected to produce a photovoltage up to 0.9 V at pH 14. The value is obtained by comparing the light open circuit voltage of $Ta_3N_5$ (ca. −0.4 V vs. NHE) and the redox potential of $Fe(CN)_6^{3-/4-}$ (+0.5 V NHE; FIG. 6). The performance of GaN/$n^+$-p Si photocathode has previously been measured and a reproducible photovoltage up to 0.6 V was obtained. When combined, the overall photovoltage of the system would be sufficient to directly charge the 2,6-DHAQ (2,6-dihydroxyanthraquinone)/Fe$(CN)_6^{4-}$ redox systems (cell voltage 1.2 V), without the need for external bias.

Example 2

Evaluation of the Alignment of the Electronic Energies

Figure 1B:
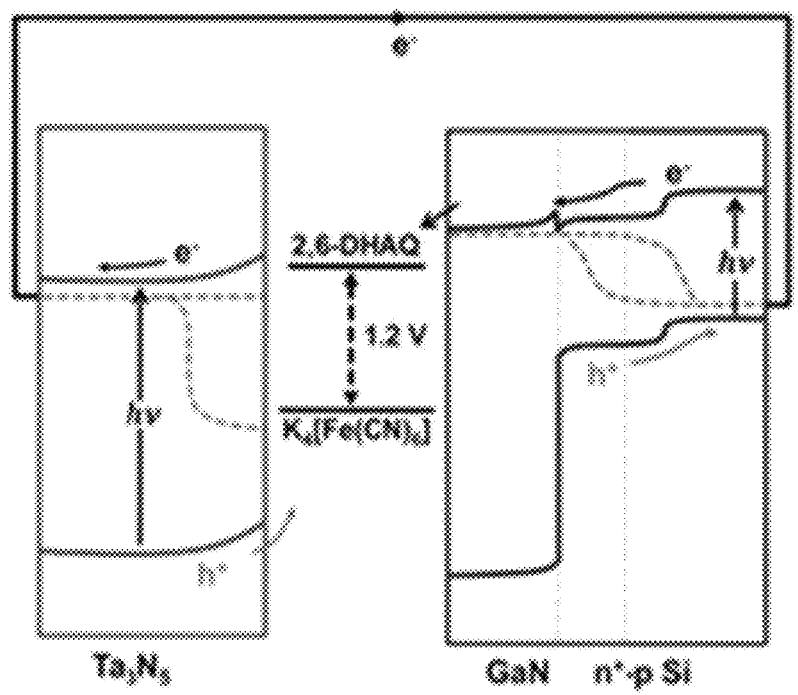
FIG. 1B is the energy band diagram under illumination showing the charge separation and flow charts of the system of FIG. 1A.

In some examples, the negative photoelectrode has a higher positive potential than the formal oxidation potential of $Fe(CN)_6^{4-}$ (+0.5 V vs. NHE). As shown in FIG. 1B, the valence band edge position of $Ta_3N_5$ is indeed more positive. In some examples, the positive photoelectrode has a more negative potential than the formal reduction potential of 2,6-DHAQ (−0.7 V vs. NHE; FIG. 6), which is satisfied by the conduction band edge position of GaN. The charge flow under illumination (during recharge) is schematically illustrated in FIG. 1B, where photogenerated holes migrate to the surface of $Ta_3N_5$ to oxidize $K_4[Fe(CN)_6]$ to $K_3[Fe(CN)_6]$, and photogenerated electrons inject from Si to GaN to reduce 2,6-DHAQ to 2,6-reDHAQ (anthracene-2,6,9,10-tetrakis(olate)). The net result of the process is that the energy delivered by light is effectively harvested by the photoelectrodes and stored in $K_3[Fe(CN)_6]$ and 2,6-reDHAQ in the form of positive and negative charges. When needed, the system can be discharged by reversing the redox reactions on carbon paper electrodes.

Example 3

Assessment of the Stability of the Electrolytes

Figure 7A:
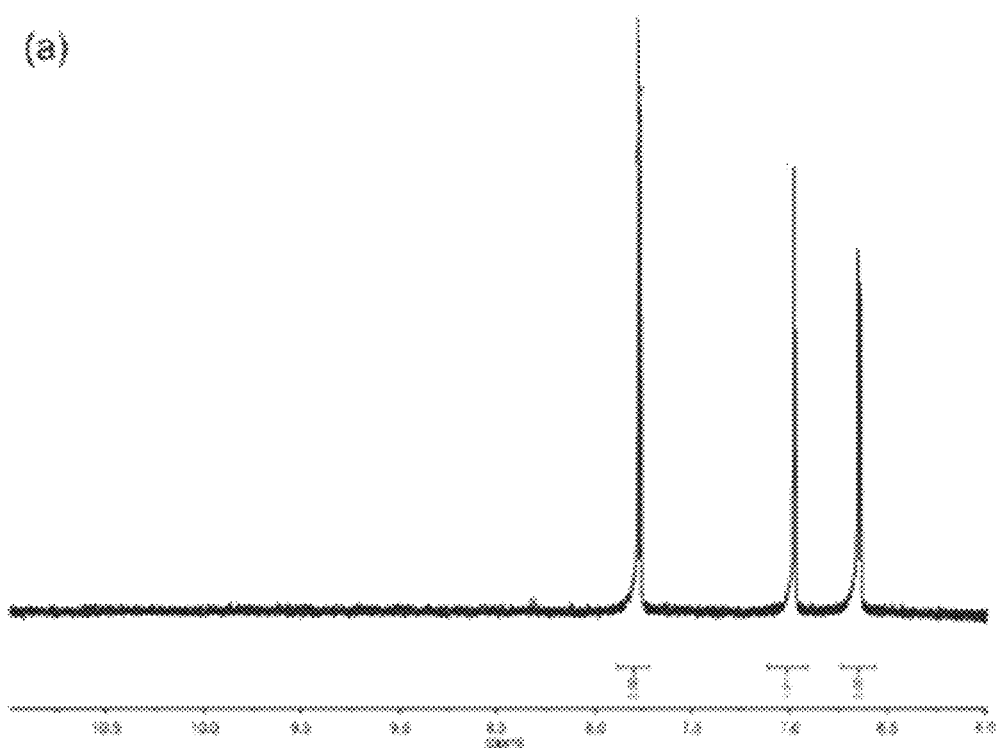
FIG. 7A shows light stability of the 2,6-DHAQ electrolyte, such as NMR spectrum of 2,6-DHAQ solution before illumination.
Figure 7B:
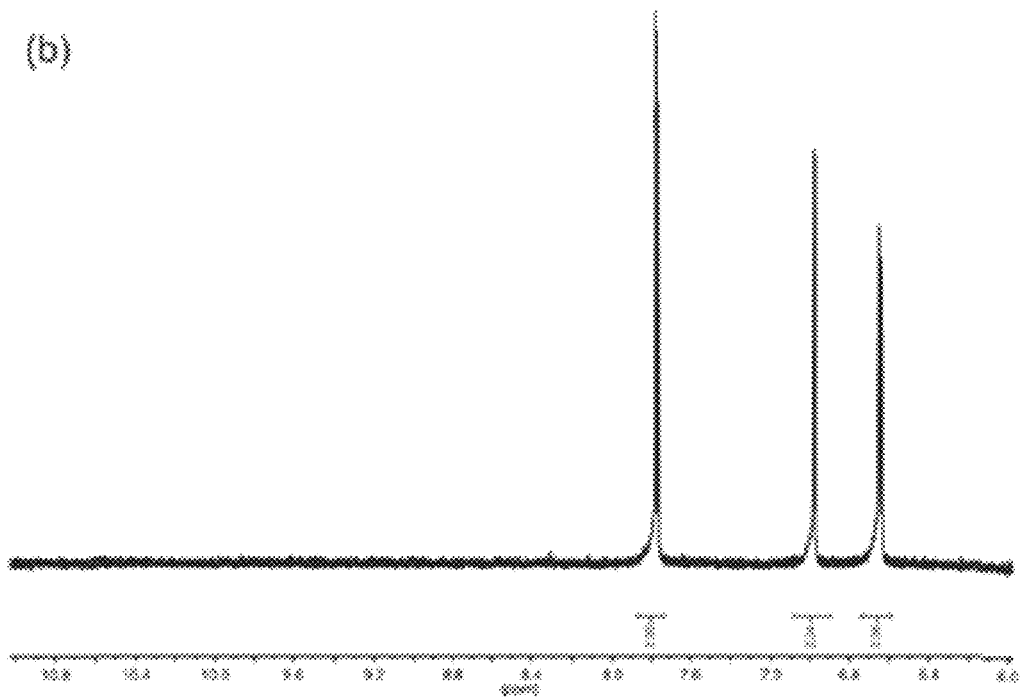
FIG. 7B shows light stability of the 2,6-DHAQ electrolyte, such as NMR spectrum of 2,6-DHAQ solution after 10 hr illumination.
Figure 8A:
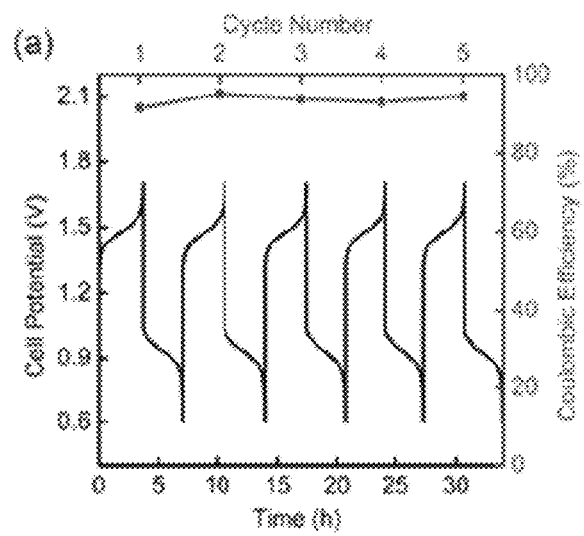
FIG. 8A shows cycling performance of the 2,6-DHAQ (pH 14)/$K_4Fe(CN)_6$ (pH 14) battery.
Figure 8B:
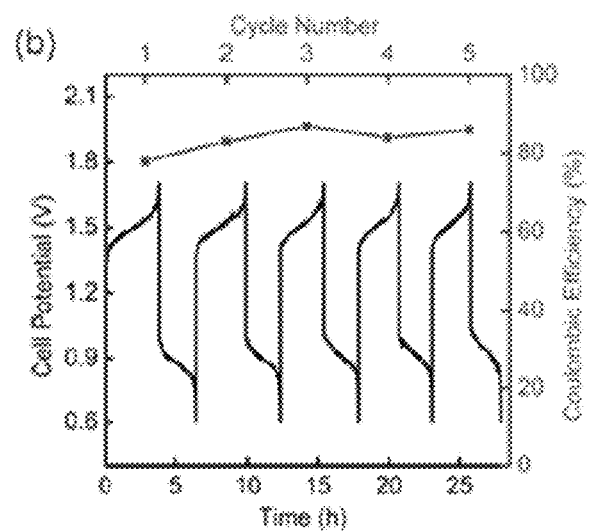
FIG. 8B shows cycling performance of the 2,6-DHAQ (pH 14)/$K_4Fe(CN)_6$ (pH 12) battery.
Figure 8C:
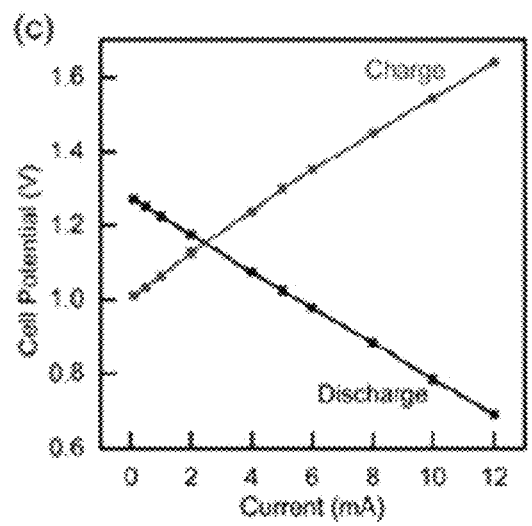
FIG. 8C shows a charge/discharge voltage vs. the current (electrode area: 1 $cm^2$) for the 2,6-DHAQ (pH 14)/$K_4Fe(CN)_6$ battery.
Figure 8D:
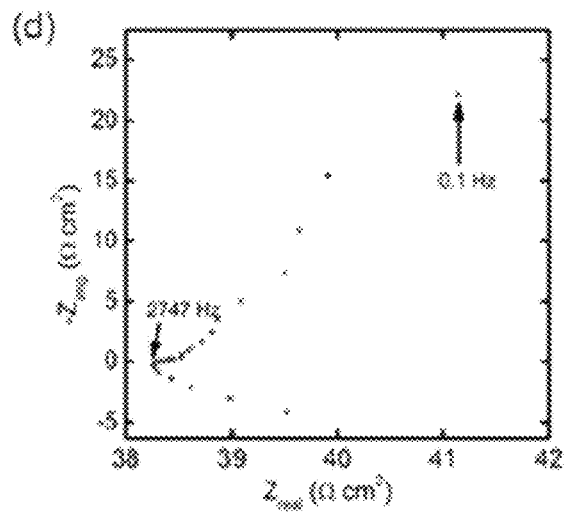
FIG. 8D shows a Nyquist plot of the electrochemical impedance spectrum in fully discharged electrolytes at open-circuit potential for the 2,6-DHAQ (pH 14)/$K_4Fe(CN)_6$ battery.
Figure 9A:
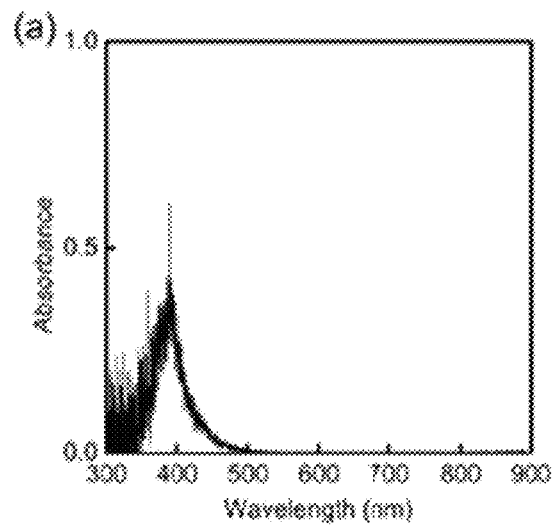
FIG. 9A shows a UV-vis absorption spectrum of 0.1 M $K_4[Fe(CN)_6]$ electrolyte.
Figure 9B:
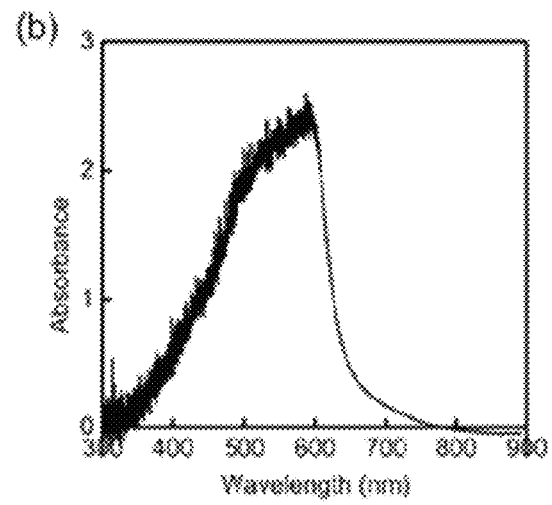
FIG. 9B shows a UV-vis absorption spectrum of 25 mM 2,6-DHAQ electrolyte.

With the suitability of the photoelectrodes established, next the stability of the electrolytes, including the redox pairs is assessed. There is strong support that the $K_4Fe(CN)_6$ and 2,6-DHAQ electrolyte system exhibits outstanding chemical and electrochemical stabilities in 1M KOH solution. However, a described system utilizes light. As such, the present disclosure focuses on the stability of the system under illumination. For this purpose, the portion of the electrolyte containing 2,6-DHAQ before and after 10 hr illumination (100 mW/$cm^2$, AM 1.5 simulated solar light) was compared by proton nuclear magnetic resonance ($^1H$ NMR) and found no measureable difference (FIGS. 7A and 7B). The result supports that 2,6-DHAQ features outstanding stability with or without illumination. The light absorption by $K_4Fe(CN)_6$, on the other hand, presented a minor challenge. It was discovered that at pH 14 ($K_4Fe(CN)_6$ concentration >0.1 M), precipitation formed within the solution after <5 min of illumination. By comparison, no precipitation was observed for the same solution in dark up to 7 days of continuous electrochemical measurements. The phenomenon is consistent with previous reports. While the detailed mechanisms of this light-induced precipitation remain unknown, it was found that the issue can be circumvented by reducing the pH to 12. No precipitation was observed up to 15 hr of illumination for a concentration up to 0.4 M. It is noted that because the formal oxidation potential of $K_4Fe(CN)_6$ is pH independent, the change of the pH does not lead to reduction of the cell voltage when combined with 2,6-DHAQ. Nevertheless, the proton concentration gradient between the catholyte ($K_4Fe(CN)_6$, pH 12) and the anolyte (2,6-DHAQ, pH 14) does present a challenge in terms of proton management and the associated chemical potential drop at the membrane (FIGS. 8A-8D), which are expected to be solved by the application of other types of membranes such as bipolar ones. In some examples, the pH of the anolyte is kept at 14 to achieve an appreciable 2,6-DHAQ concentration (up to 0.4 M, 90% purity). Another issue which had to be addressed was the light absorption by the electrolyte, which would reduce the light intensity reaching the photoelectrode and, hence, the efficiency of the system (FIGS. 9A and 9B). The strategy is to minimize the optical path by pressing the photoelectrode close to the transparent window. Additionally, the light intensity was calibrated at the position where the photoelectrodes were placed in the solution using an immersed photodiode to compensate for the lost photons. As a result, the reported intensity (100 mW/$cm^2$) reflects the true intensity of light absorbed by the photoelectrodes, although spectra correction to compensate for electrolyte absorption was not conducted.

Example 4

Photoelectrochemical Data of the Photoanode and the Photocathode

In FIGS. 2A-2D, the photoelectrochemical (PEC) data of the photoanode and the photocathode is presented. First, it can be seen from FIG. 2A that the saturation current of the photoanode depends on the redox concentration. This feature is understood as the dependence of the saturation current on the mass-transport. When the concentration of $K_4Fe(CN)_6$ is greater than 0.1 M, the saturation current reaches a maximum of up to ca. 12 mA/$cm^2$, which is limited by the photogenerated hole concentration in $Ta_3N_5$.

In some examples, a high concentration of $K_4Fe(CN)_6$ is used to ensure all photogenerated charges can be readily collected. It is noted that the solubility of $K_4Fe(CN)_6$ in alkaline solutions limits the concentration to ca. 0.4 M, in some examples. Similarly, the saturation current of the photocathode depends on the concentration of 2,6-DHAQ (FIG. 2C), and the highest concentration as limited by its solubility is 0.4 M.

Figure 2A:
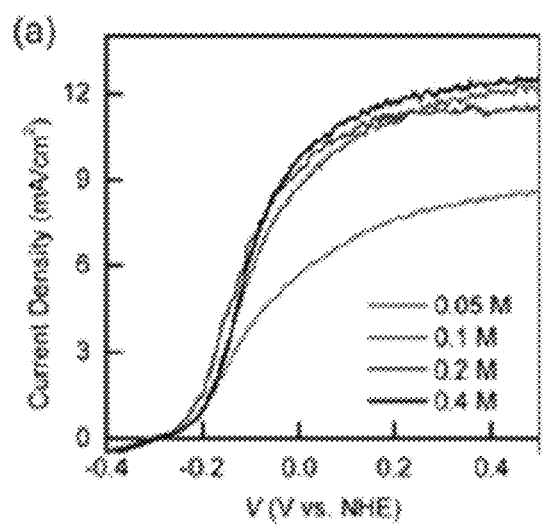
FIG. 2A illustrates J-V curves of $Ta_3N_5$ photoanode over different concentrations of $K_4[Fe(CN)_6]$ in KOH solution (pH 12).
Figure 2B:
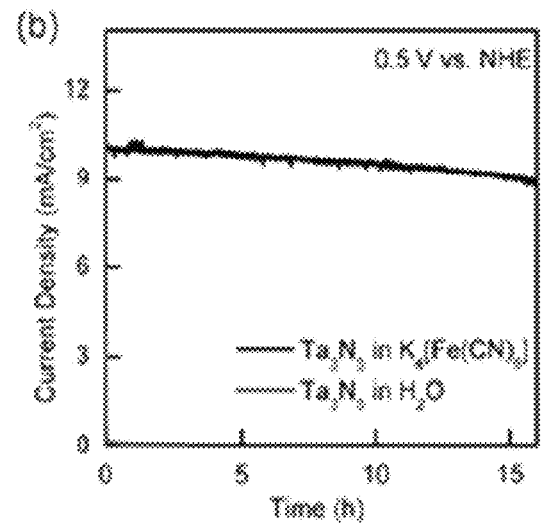
FIG. 2B illustrates chronoamperometry of $Ta_3N_5$ for PEC oxidation in 0.4 M $K_4[Fe(CN)_6]$/KOH solution in comparison to KOH solution (pH 12).
Figure 2C:
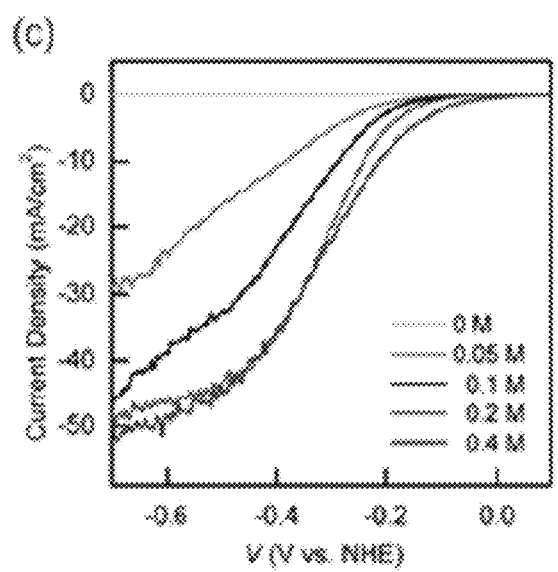
FIG. 2C illustrates J-V curves of GaN/Si photocathode over different concentrations of 2,6-DHAQ in KOH solution (pH 14).
Figure 2D:
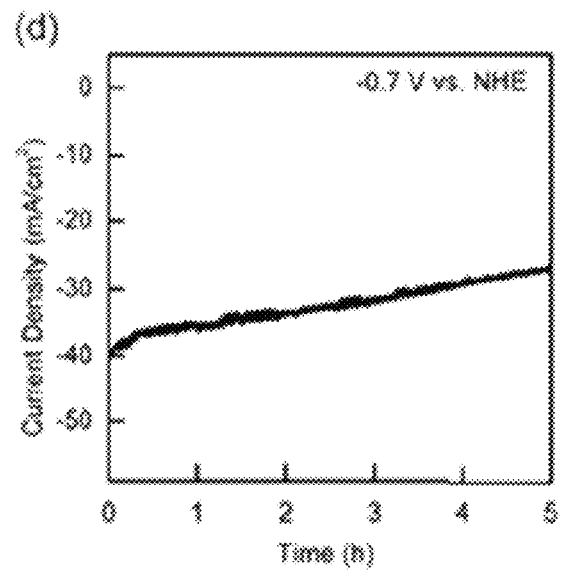
FIG. 2D illustrates chronoamperometry of GaN/Si for PEC reduction in 0.1 M 2,6-DHAQ/KOH solution (pH 14).

Second, both systems feature reasonable stability, with the photoanode performance decayed 10.9% (from 10.1 mA/cm$^2$ to 9.0 mA/cm$^2$ in 15 hr; FIG. 2B) and the photocathode decayed 33.3% (from −40.5 mA/cm$^2$ to −27.0 mA/cm$^2$ in 5 hr; FIG. 2D). It is noted that a thin (ca. 25 nm) $TiO_2$ passivation layer is deposited on the GaN/Si photocathode by atomic layer deposition (ALD) to improve its stability. In some examples, further enhancement of stability is achieved by improving of the uniformity and optimization of the thickness of $TiO_2$ surface protection layer or using other surface passivation layers and/or co-catalysts.

Figure 10A:
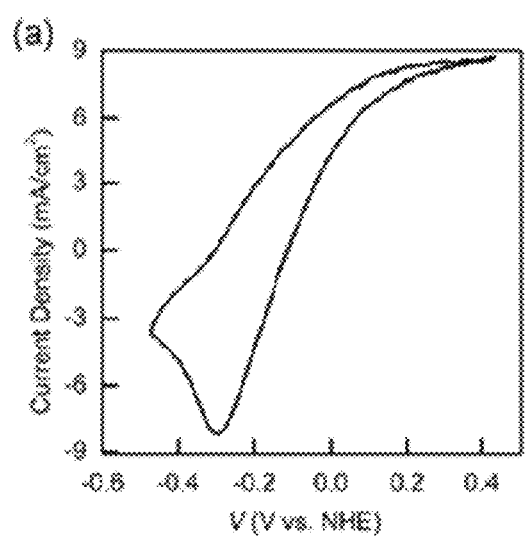
FIG. 10A shows CVs of $Ta_3N_5$ photoelectrodes in 0.4 M $K_4[Fe(CN)_6]$/KOH solution (pH 12) at scan rate of 100 mV/s, with a scan direction from negative to positive, then to negative again.
Figure 10B:
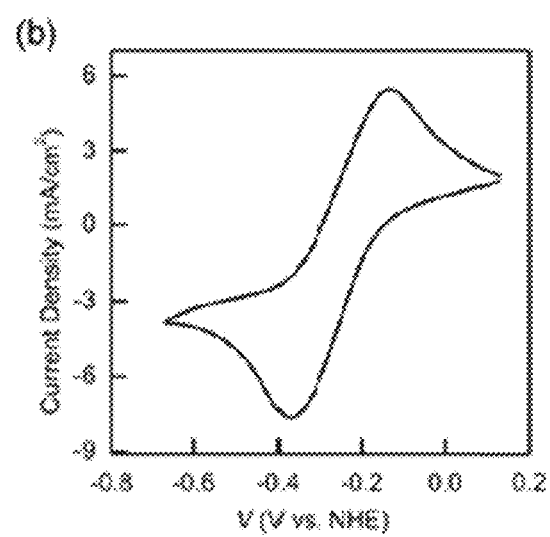
FIG. 10B shows CVs of $TiO_2$/GaN/Si photoelectrodes in 0.025 M 2,6-DHAQ/KOH solution (pH 14, unstirred), at a scan rate of 20 mV/s, and a scan direction from positive to negative, then to positive again.

Third, the $Ta_3N_5$ photoanode performance decayed rapidly in the absence of $K_4Fe(CN)_6$ (current density dropped from 3.9 mA/cm$^2$ to 0.15 mA/cm min). The results support that the observed performance in $K_4Fe(CN)_6$ corresponds to the oxidation of $K_4Fe(CN)_6$ but not water oxidation. Similarly, no activity was measured on the GaN/Si photocathode in the absence of 2,6-DHAQ, supporting that hydrogen evolution does not contribute to the measured performance as shown in FIGS. 2C and 2D. Additionally, the cyclic voltammetries of both photoelectrodes in the presence of redox pairs display the obvious redox peaks, which are specific to the desired redox reactions instead of water splitting (FIGS. 10A and 10C).

Figure 11:
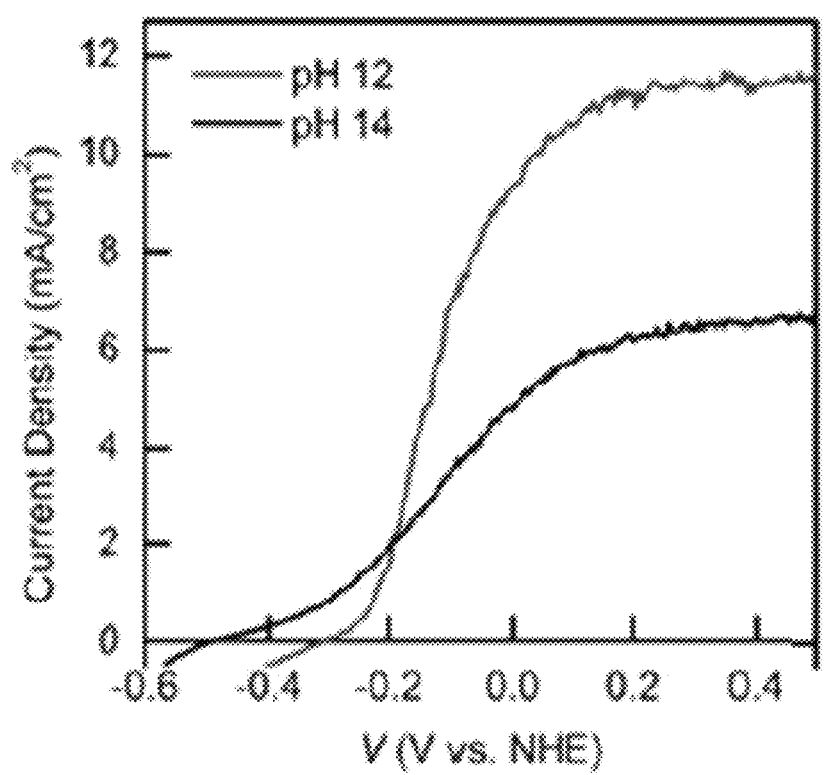
FIG. 11 shows J-V curves of $Ta_3N_5$ in 0.4 M $K_4[Fe(CN)_6]$/KOH solution with different pH values.

Lastly, it is noted that if the photovoltage is defined as the difference between the on-set potential and the formal oxidation (or reduction) potential of the redox pairs, a photovoltage of 0.8 V was measured on the $Ta_3N_5$ photoanode and 0.6 V was measured on the GaN/Si photocathode. In some examples, the combined cell voltage (1.4 V) is slightly lower than the predicted 1.5 V from open circuit potential measurements. Possible reasons include the decrease of $Ta_3N_5$ photovoltage caused by the positive shift of the conduction band edge of $Ta_3N_5$ in pH 12 compared to pH 14 (59 mV/pH unit; FIG. 11).

Figure 3A:
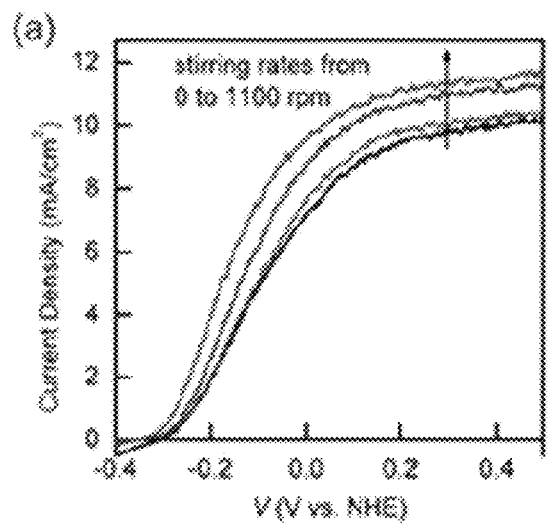
FIG. 3A illustrates J-V curves of $Ta_3N_5$ photoanode in 0.4 M $K_4[Fe(CN)_6]$/KOH solution (pH 12) at different stirring speeds.
Figure 3B:
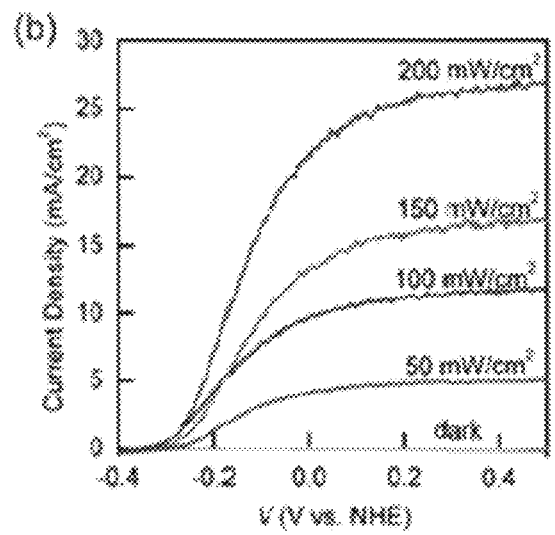
FIG. 3B illustrates J-V curves of $Ta_3N_5$ photoanode in 0.4 M $K_4[Fe(CN)_6]$/KOH solution (pH 12) under different light intensities.
Figure 3C:
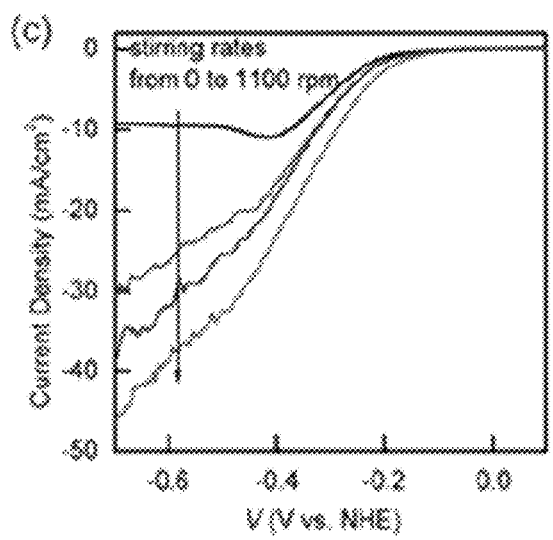
FIG. 3C illustrates J-V curves of $TiO_2$/GaN/Si photocathode in 0.1 M 2,6-DHAQ/KOH solution (pH 14) at different stirring speeds.
Figure 3D:
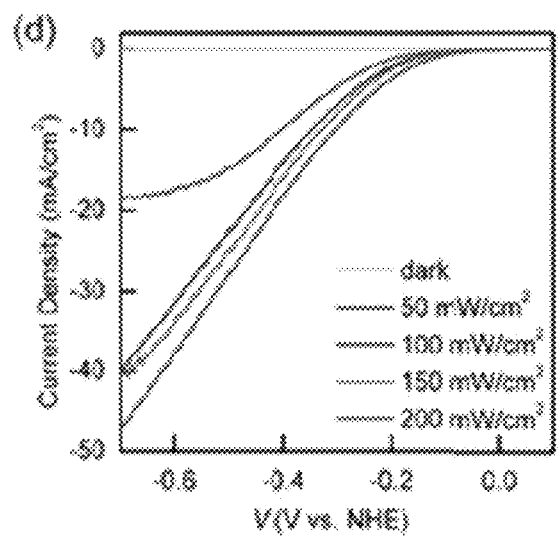
FIG. 3D illustrates J-V curves of $TiO_2$/GaN/Si photocathode in 0.1 M 2,6-DHAQ/KOH solution (pH 14) under different light intensities.
Figure 12A:
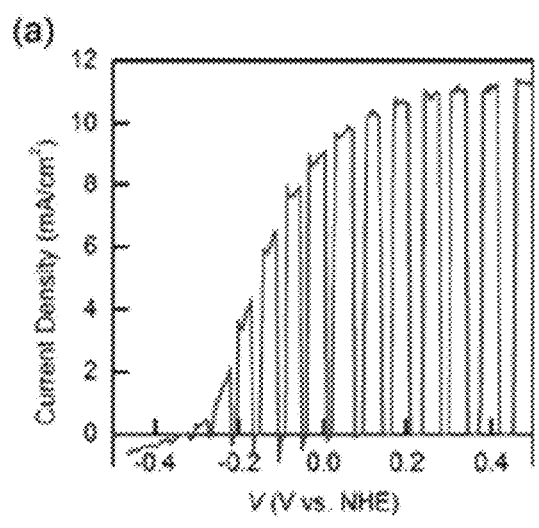
FIG. 12A shows chopped light J-V studies of the $Ta_3N_5$ photoelectrodes in 0.4 M $K_4Fe(CN)_6$/KOH solution (pH 12).
Figure 12B:
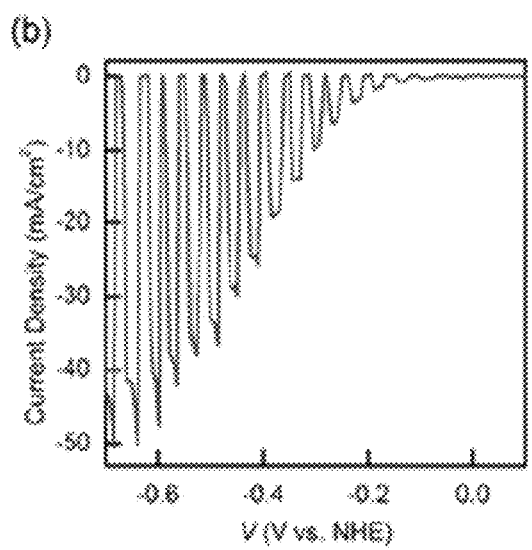
FIG. 12B shows chopped light J-V studies of the $TiO_2$/GaN/Si photoelectrodes in 0.1 M 2,6-DHAQ/KOH solution (pH 14).

More detailed PEC characterizations are presented in FIGS. 3A-3D, where it is evaluated whether mass transport or charge transfer is the limiting factor for both the photoanode and the photocathode. As shown in FIG. 3A, while the saturation current for the $Ta_3N_5$ photoanode does increase with the stirring speed, the dependence is relatively insignificant. For instance, the saturation current density only increased 14.7% (from 10.2 mA/cm$^2$ to 11.7 mA/cm$^2$) when the system was changed from without stirring to a maximum of 1100 rpm. The result suggests that mass-transport of $K_4Fe(CN)_6$ is not a limiting factor in defining the overall PEC performance of the photoanode, which is also supported by the chopped light J-V study (FIGS. 12A and 12B). Important to this discussion, a near linear dependence was observed of the saturation current on the light intensity (5.2 mA/cm$^2$ for 50 mW/cm$^2$; 11.7 mA/cm$^2$ for 100 mW/cm$^2$; 16.9 mA/cm$^2$ for 150 mW/cm$^2$; and 26.9 mA/cm$^2$ for 200 mW/cm$^2$; FIG. 3B). It is worth noting that the saturation photocurrents approach the theoretical photocurrent densities at the corresponding light intensities, which supports that both the mass transport of $K_4Fe(CN)_6$ from the bulk solution to $Ta_3N_5$ surface and the $Ta_3N_5/K_4Fe(CN)_6$ interface charge transfer are not limiting factors in defining the overall PEC performance of $Ta_3N_5$. By contrast, the near linear dependence of the saturation current of the GaN/Si photocathode on the stirring speed (FIG. 3C) and the weak correlation of the saturation current with the light intensity above 100 mW/cm$^2$ (FIG. 3D) suggest that mass transport of 2,6-DHAQ is a limiting factor. In addition, the obvious photocurrent spikes in the GaN/Si chopped light curve also indicated the limited mass transfer of 2,6-DHAQ (FIG. 12). In some examples, fluidic management is used to actualize the full potentials of the photocathode system. Moreover, the photovoltage (0.6 V) and the photocurrent density (40 mA/cm$^2$) at −0.7 V vs. NHE measured on the photocathode are close to what is theoretically possible for Si and comparable to what was measured on the GaN/Si system for reactions such as hydrogen evolution reaction (HER) or $CO_2$ reduction. In some examples, a co-catalyst, such as carbon, is used on the photoanode.

Example 5

Investigation of the Integrated System

Figure 4A:
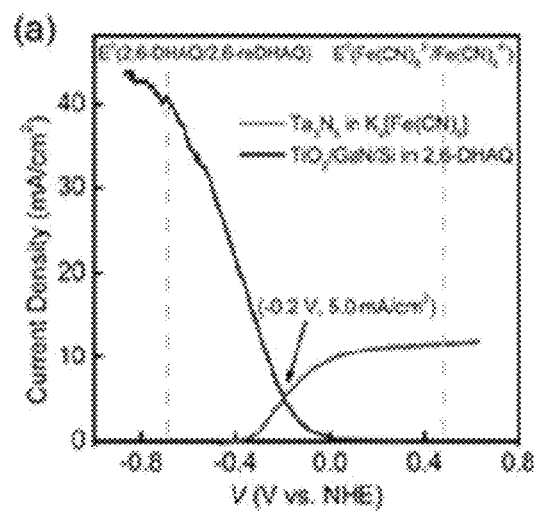
FIG. 4A illustrates the integration of the $Ta_3N_5$ photoanode and the GaN/Si photocathode, showing the overlay of the reduction and oxidation curves, where the dotted vertical lines represent the formal reduction and oxidation potentials of the redox system.

Various investigation aspects of the integrated system will now be described. The investigation was approached in two steps. During the first step, the photooxidation and photoreduction performance were compared, measured separately, and the data are plotted in FIG. 4A. When characterized separately in a 3-electrode configuration, the two curves overlap to yield an intersection point where 5 mA/cm$^2$ photocurrent is expected. Note that here each photoelectrode was illuminated by light of the same intensity (100 mW/cm$^2$). By assuming the equilibrium potential of 1.2 V, it is estimated that the overall solar-to-chemical energy conversion efficiency of 3.0%. Such an efficiency is high when compared with solar-to-hydrogen conversion efficiencies in similar solar water splitting systems. It is also high among photo-rechargeable redox batteries. In some examples, the two photoelectrodes are arranged in tandem thereby further increasing the efficiency of the photorechargeable high voltage redox battery.

Figure 4B:
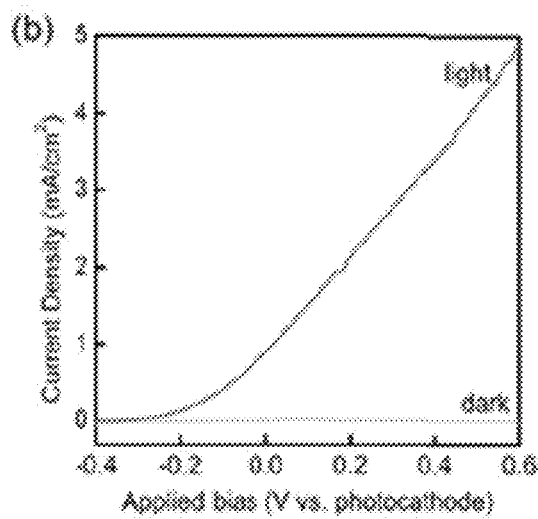
FIG. 4B also illustrates the integration of the $Ta_3N_5$ photoanode and the GaN/Si photocathode, showing J-V characteristics of a two-electrode configuration under light and dark conditions, where the projected areas of $Ta_3N_5$ and $TiO_2$/GaN/Si are 0.78 $cm^2$ and 0.54 $cm^2$, respectively.
Figure 13A:
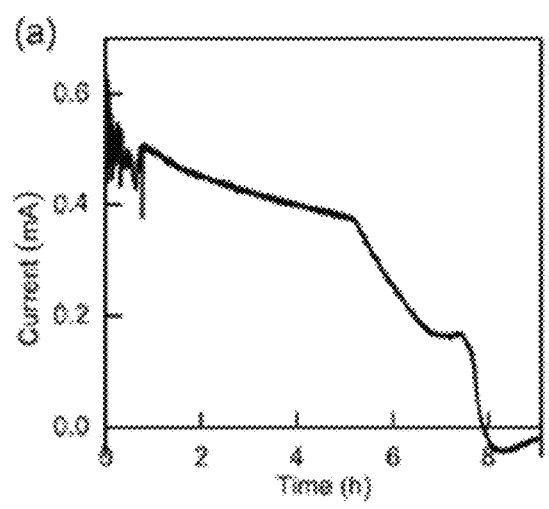
FIG. 13A shows unassisted performance of the 2,6-DHAQ/$K_4[Fe(CN)_6]$ battery during the photocharge process.
Figure 13B:
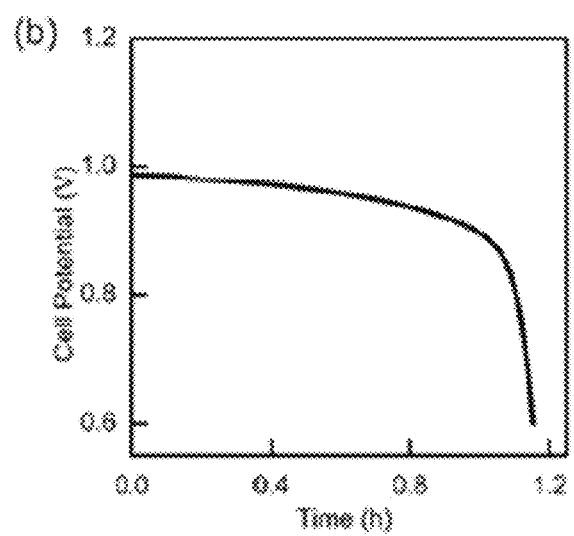
FIG. 13B shows unassisted performance of the 2,6-DHAQ/$K_4[Fe(CN)_6]$ battery during discharge (voltage-time profile), after photocharge with the applied current of 0.5 mA (current density: 0.5 $mA/cm^2$).
Figure 14A:
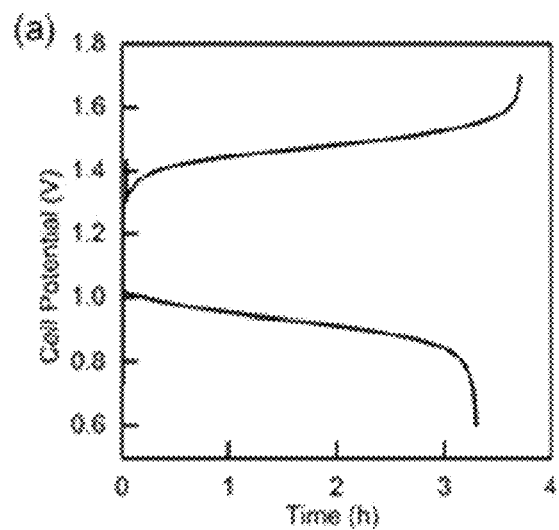
FIG. 14A shows the electrochemical performance of 2,6-DHAQ/$K_4[Fe(CN)_6]$ battery at 5 $mA/cm^2$ applied current density (both catholyte and anolyte are in pH 14 KOH solution).
Figure 14B:
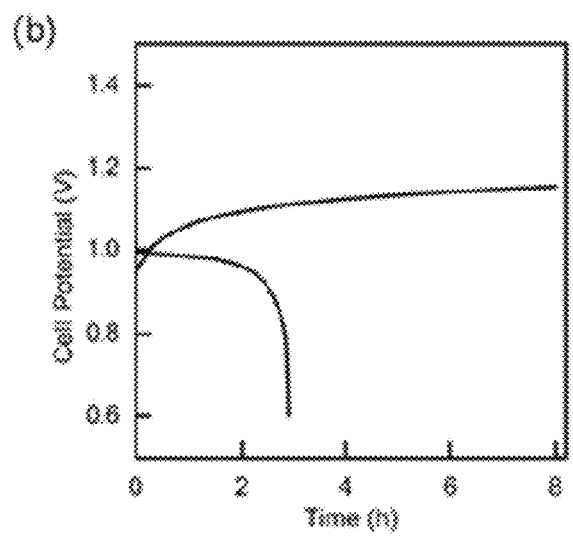
FIG. 14B shows the electrochemical performance of 2,6-DHAQ/$K_4[Fe(CN)_6]$ battery at 0.5 $mA/cm^2$ applied current density (both catholyte and anolyte are in pH 14 KOH solution).

During the second step, the system was studied in a truly integrated fashion by connecting the two photoelectrodes in a single cell (separated by a Nafion membrane). As shown in FIG. 4B, a linear sweep voltammogram of the dual-photoelectrode shows an average photocurrent density of 0.93 mA/cm$^2$ at $V_{app}$=0 V, indicating that the unassisted photocharge could be achieved in a single cell experimentally. Note that the photocurrent is normalized to the average working area due to the different areas of the two photoelectrodes. During the photocharge process, the photoelectrodes are directly short-circuited without external bias and the photocurrent-time curve is monitored by a potentiostat. When the cell was discharged using two carbon paper electrodes independent of the photoelectrodes, a high discharge voltage (∼1 V) and a modest capacity (200 mAh/L) were obtained, which corresponded to 22% of the recharge capacity (FIGS. 13A-13B). Separate electrochemical characterizations suggest that the low Coulombic efficiency may be due to the low current densities. As detailed in the present disclosure, >92% Coulombic efficiencies were consistently obtained when the charge current density was at 5 mA/cm$^2$ or higher. At 0.5 mA/cm$^2$, however, the efficiency was reduced to 35% (FIGS. 14A-14B). Thus it is concluded that it is not specific to the photocharge but an inherent issue to the system at low charge current densities. Possible reasons include the crossover of the active material through the membrane and the aggravated side reactions, such as oxygen reduction reaction at low current densities. It is envisioned that switching from the stirred H-cell design (FIG. 15) to a practical flow battery configuration for better deaeration of 2,6-DHAQ redox electrolyte and improved electrolyte mass transfer could further improve the Coulombic efficiency. In some examples, the negative compartment comprises a deaeration mechanism.

Overall, the present disclosure successfully demonstrated a 1.2 V solar rechargeable redox battery based on the integration of $Ta_3N_5$ nanotube photoanode and GaN nanowire/Si photocathode with the 2,6-DHAQ/$K_4[Fe(CN)_6]$ redox pairs. The good solar-to-charge conversion performance of the individual photoelectrodes enabled the measurement of high photovoltages (>1.4 V), making it possible to photorecharge the redox battery without externally applied potentials. The optimal solar-to-chemical conversion efficiency was estimated up to 3.0%. It is envisioned that this efficiency would be readily improved when the two photoelectrodes are arranged in tandem. Other competing PEC reactions, such as water splitting, are negligible in the system of the present disclosure, even though the redox potentials of $Fe(CN)_6^{3-}/Fe(CN)_6^{4-}$ and 2,6-DHAQ/2,6-reDHAQ are close to water oxidation and reduction potentials. The integrated battery was successfully photocharged and then discharged with a stable voltage output of up to 1 V. The demonstration of the present disclosure opens up a new door to photochargeable high-voltage redox (flow) batteries.

In some examples, $Ta_3N_5$ and GaN/Si photoelectrodes comprise one or more catalysts to enhance their activities and stabilities.

The present disclosure realized an unassisted solar rechargeable redox battery using $Ta_3N_5$ as photoanode and GaN/Si as photocathode. It features high operating voltage, good efficiency and long stability. This disclosure is different from other existing technologies in the following ways. First, solar energy utilization typically requires external connection between different devices. In contrast, solar rechargeable redox flow battery integrates photo conversion system and energy storage part in a compact single unit with minimized energy loss during device-to-device transfer, simplified manufacturing processes and lower fabrication costs. Second, solar rechargeable redox flow battery provides an innovative approach for efficient, scalable and inexpensive solar energy harvesting and storage by taking advantages of both photoelectrochemical cell and redox flow battery. In contrast, the direct connection of commercially available solar cells with batteries is too expensive and not amenable to scaling.

The present disclosure is a new use of photoelectrodes for an unassisted solar rechargeable redox battery. Some of the novel features are: 1) high photovoltages: the combined photovoltage of $Ta_3N_5$ and GaN/Si exceeds 1.4 V, which is sufficient to unassistedly charge the selected redox flow battery and many others and 2) high efficiencies and good stabilities: the solar rechargeable battery application could enable both photoelectrodes with high efficiencies and good stabilities which are hard to achieve by other applications such as solar water splitting.

The advantages of the present disclosure include: 1) high operational voltage which promises high energy densities, 2) applicable for potential grid-scale solar energy storage, and 3) it is cost-effective, environmentally friendly and safe.

The present disclosure could be used in applications where a demand of solar energy conversion and energy storage is presented, that include but not limited to: 1) cost-effective way to recharge redox flow batteries, 2) off-grid solar power system, 3) solar-powered transportation, 4) nearly zero-energy buildings, 5) household stationary energy storage, 6) community energy storage, and 7) grid scale energy storage for demand response.

Many applications listed above rely heavily on the cost-effective and large-scale utilization of renewable energy such as solar energy. The present disclosure would contribute as a cost-effective solution to large-scale solar energy conversion and storage.

Large-scale, practical implementations of solar energy demands for cost-effective and scalable solar energy conversion and storage solutions. The easiest solution to this issue may be to combine commercially available solar cells with batteries (e.g., state-of-the-art Li-ion batteries). However, the prohibitive cost from both the photovoltaic and battery modules makes this approach impractical. Moreover, the approach is not amenable to scaling. In contrast, the solar rechargeable redox flow batteries of the present disclosure are based on cost-effective semiconductors and inexpensive aqueous redox flow batteries. In addition, the integrated solar rechargeable battery system brings other advantages such as minimized device-to-device energy transfer loss and reduced fabrication costs related with complicated manufacturing processes. Distinct from conventional solid-state rechargeable batteries, solar rechargeable redox flow batteries are also more suitable for large-scale energy conversion and storage application due to the separation of power capability and the energy storage capability. Furthermore, the utilization of non-corrosive aqueous active materials makes the present disclosure inherently safer and more environmentally friendly than other current solutions.

What is claimed is:

1. A photorechargeable high voltage redox battery comprising
    a positive photoelectrode, comprising GaN nanowires on Si with buried p-n junctions;
    a negative photoelectrode, comprising $Ta_3N_5$ nanotubes;
    a membrane, disposed between the positive photoelectrode and the negative photoelectrode; and
    an electrolyte, comprising a positive compartment and a negative compartment, disposed on different sides of the membrane such that the membrane provides ionic communication between the positive compartment and the negative compartment,
        wherein a composition of the electrolyte in the positive compartment is different than that in the negative compartment,
        wherein the positive photoelectrode is disposed within the positive compartment of the electrolyte and in direct contact with the electrolyte in the positive compartment, and
        wherein the negative photoelectrode is disposed within the negative compartment of the electrolyte and in direct contact with the electrolyte in the negative compartment.

2. The photorechargeable high voltage redox battery of claim 1, wherein the positive compartment comprises potassium ferrocyanide ($K_4[Fe(CN)_6]$).

3. The photorechargeable high voltage redox battery of claim 2, wherein a concentration of potassium ferrocyanide ($K_4[Fe(CN)_6]$) in the positive compartment is between about 0.3-0.5M.

4. The photorechargeable high voltage redox battery of claim 1, wherein the positive compartment has a pH of between about 12 and 14.

5. The photorechargeable high voltage redox battery of claim 1, wherein the negative compartment comprises 2,6-dihydroxyanthraquinone (2,6-DHAQ).

6. The photorechargeable high voltage redox battery of claim 5, wherein a concentration of 2,6-dihydroxyanthraquinone (2,6-DHAQ) in the negative compartment is 0.05-0.015M.

7. The photorechargeable high voltage redox battery of claim 1, wherein the negative compartment has a pH of between about 12 and 14.

8. The photorechargeable high voltage redox battery of claim 1, wherein the electrolyte comprises potassium hydroxide (KOH) in both the positive compartment and the negative compartment.

9. The photorechargeable high voltage redox battery of claim 1, wherein the negative photoelectrode further comprising a co-catalyst.

10. The photorechargeable high voltage redox battery of claim 1, wherein the co-catalyst is carbon.

11. The photorechargeable high voltage redox battery of claim 1, wherein the photorechargeable high voltage redox battery has an overall solar-to-chemical energy conversion efficiency of at least 3.0%.

12. The photorechargeable high voltage redox battery of claim 1, wherein the photorechargeable high voltage redox battery is a flow battery.

13. The photorechargeable high voltage redox battery of claim 1, wherein the negative compartment comprises a deaeration mechanism.

14. The photorechargeable high voltage redox battery of claim 1, wherein the photorechargeable high voltage redox battery has an operating voltage of at least about 1.4V.

* * * * *